(12) United States Patent
Li et al.

(10) Patent No.: US 8,045,782 B2
(45) Date of Patent: Oct. 25, 2011

(54) METHOD OF, AND APPARATUS AND COMPUTER SOFTWARE FOR, IMPLEMENTING IMAGE ANALYSIS PROTOCOLS

(75) Inventors: Xudong Li, Piscataway, NJ (US); Louis Ernest Dagenais, Montreal (CA); William Mark Durksen, St. Catharines (CA); Del Archer, Oakville (CA)

(73) Assignee: GE Healthcare Niagara, Inc., Mississauga (CA)

( * ) Notice: Subject to any disclaimer, the term of this patent is extended or adjusted under 35 U.S.C. 154(b) by 973 days.

(21) Appl. No.: 11/019,326

(22) Filed: Dec. 7, 2004

(65) Prior Publication Data
US 2006/0120603 A1     Jun. 8, 2006

(51) Int. Cl.
*G06K 9/00* (2006.01)

(52) U.S. Cl. ........ 382/133; 382/103; 382/128; 382/134; 382/155; 382/159; 382/181; 382/224; 704/19; 704/21

(58) Field of Classification Search .................. 382/128, 382/129, 133, 134, 276, 307, 131, 103, 155, 382/159, 181, 224; 702/19, 21
See application file for complete search history.

(56) References Cited

U.S. PATENT DOCUMENTS

| | | | | |
|---|---|---|---|---|
| 5,072,382 A | * | 12/1991 | Kamentsky | 382/133 |
| 5,202,931 A | * | 4/1993 | Bacus | 382/133 |
| 5,355,215 A | | 10/1994 | Schroeder et al. | |
| 5,787,189 A | * | 7/1998 | Lee et al. | 382/133 |
| 6,687,395 B1 | * | 2/2004 | Dietz et al. | 382/133 |
| 2001/0041347 A1 | * | 11/2001 | Sammak et al. | 702/19 |

FOREIGN PATENT DOCUMENTS

| WO | WO00/72258 | 11/2000 | |
|---|---|---|---|
| WO | WO 2004088573 A1 | * 10/2004 | |

* cited by examiner

*Primary Examiner* — Bhavesh Mehta
*Assistant Examiner* — Daniel Zeilberger

(57) ABSTRACT

A computer-based method for the development of an image analysis protocol for analyzing image data, the image data containing images including image objects, in particular biological image objects such as biological cells. The image analysis protocol, once developed, is operable in an image analysis software system to report on one or more measurements conducted on selected ones of the image objects. The development process includes providing functions for selecting predetermined image analysis procedures, the functions allowing the user to define:

at least one first target identification setting for identifying a first target set of image objects in the image data;

at least one second target identification setting for identifying a second target set of image objects in the image data;

a relationship between the first and second set of image objects; and one or more measurements which are to be reported for the image data, the measurements being conducted using the defined relationship.

31 Claims, 8 Drawing Sheets

METHOD OF, AND APPARATUS AND
COMPUTER SOFTWARE FOR,
IMPLEMENTING IMAGE ANALYSIS
PROTOCOLS

FIELD OF THE INVENTION

The invention relates to methods of development of image analysis protocols. The invention further relates to apparatus and computer software arranged to carry out such a method, and apparatus and computer software arranged to conduct image analysis protocols developed using the development methods of the invention.

BACKGROUND OF THE INVENTION

There is currently a need in drug discovery and development and in general biological research for methods and apparatus for accurately performing cell-based assays. Cell-based assays are advantageously employed for assessing the biological activity of chemical compounds.

In addition, there is a need to quickly and inexpensively screen large numbers of chemical compounds. This need has arisen in the pharmaceutical industry where it is common to test chemical compounds for activity against a variety of biochemical targets, for example, receptors, enzymes and nucleic acids. These chemical compounds are collected in large libraries, sometimes exceeding one million distinct compounds.

In the field of compound screening, cell-based assays are run on populations of cells. The measured response is usually an average over the cell population. For example, a popular instrument used for ion channel assays is disclosed in U.S. Pat. No. 5,355,215. A typical assay consists of measuring the time-dependence of the fluorescence of an ion-sensitive dye, the fluorescence being a measure of the intra-cellular concentration of the ion of interest which changes as a consequence of the addition of a chemical compound. The dye is loaded into the population of cells disposed on the bottom of the well of a multi-well plate at a time prior to the measurement.

Different assays require different image analysis protocols in order to provide meaningful results. In known image analysis systems, pre-defined image analysis protocols are built-in to the image analysis software systems provided for the purpose of analysing the experimental data produced in an assay. These image analysis protocols are sometimes referred to as "canned" image analysis protocols. The user can typically vary parameters associated with different steps of a canned protocol, in order to fine tune the image analysis and improve the results depending on the conditions and other parameters of their experimental set-up.

International patent publication number WO 00/72258 describes a method for the general purpose analysis of experimental data. A method for the development of image analysis protocols is proposed, in which a user is able to select from a set of predetermined general assay features, including object features, aggregate features and general purpose image processing features. So-called "feature gates" which can be used to define sub-sets of an object population that will contribute to an object or aggregate feature set. Feature gates are defined in terms of a range including a lower and upper limit in the range. However, the flexibility in definition of image processing protocols which can be developed using the proposed system remains relatively limited, particularly when there are objects which are interrelated, such as a cell and its nucleus. Further, the object features for which data can be reported are limited.

It is an object of the invention to provide an improved image analysis protocol development environment which allows users, including users without a computer programming background, to develop their own automated image analysis protocols in a flexible and intuitive manner.

SUMMARY OF THE INVENTION

In accordance with one aspect of the present invention, there is provided a computer-based method for the development of an image analysis protocol for analyzing image data, the image data containing images including image objects, the image analysis protocol being operable in an image analysis software system to report on one or more measurements conducted on selected ones of said image objects,
the method comprising providing functions for selecting predetermined image analysis procedures, said functions allowing a user to define:
at least one first target identification setting for identifying a first target set of image objects in said image data;
at least one second target identification setting for identifying a second target set of image objects in said image data;
a relationship between said first and second set of image objects; and
one or more measurements which are to be reported for said image data, said measurements being conducted using said defined relationship.

The invention allows a user without knowledge of programming techniques to develop an image analysis protocol for which an existing solution may not currently exist.

Defining a relationship between sets of image objects, referred to herein also as "target linking," allows complicated hierarchies to be developed through relatively simple choices made by the user, for example linking individual target sets in a pair-wise basis, and combining such links again in a pair-wise basis.

Measurements can be reported for any individual target set or target sets representing any given hierarchy of related objects, for example a cell composed of a cell body, nucleus and neurites, all of which can be analysed in an interrelated manner.

Measurements can be reported for any specific individual of a target set or as a summary (e.g. minimum, maximum, mean, median, mode, standard deviation, count, etc.) value for any selected targets set.

A user can select any of a set of primitive, i.e. built-in, measurements to be calculated for any target set and/or any of a set of statistical calculations (minimum, maximum, mean, median, mode, standard deviation, count, etc.) to be calculated for any target set.

Further, complex measurements can be created by defining a valid arithmetic equation whose operands are constant values, primitive measurements or other complex measurements. A complex measurement equation can call on any combination of individual or summary measurements of any target set.

Once an image analysis protocol is defined, it can then be applied to any number of image stacks in an automated process.

Further features and advantages of the invention will become apparent from the following description of preferred embodiments of the invention, given by way of example only, which is made with reference to the accompanying drawings.

DETAILED DESCRIPTION OF THE INVENTION

The present invention provides an image analysis software system which includes functionality for the development of user-defined image analysis protocols. The image analysis protocols are defined by the selection and definition of settings within a user interface provided by the image analysis software system.

The development of an image analysis protocol includes a sequence of operations (pre-processing, segmentation, post-processing, target linking, measurement selection and/or measurement definition). The pre-processing, segmentation and post-processing steps, which may be referred to as a whole as "target identification," identify areas of pixels, referred to herein as image objects, in the image data that represent targets of interest (e.g. cell bodies, nuclei, neurites, granules, etc.). Target linking is where relationships are defined between the various previously defined targets (e.g. nuclei are within a cell body, neurites touch the cell body, etc.) so as to define hierarchical relationships which then allow for highly refined measurements to be reported on. Measurement and data reporting, which can be referred to as "image quantification", is where properties (e.g. mean pixel intensity, object area, object centroid position, etc.) of the previously identified targets are calculated, preferably for each individual target, and reported to the user either on an individual basis or as a summary value for the set of targets.

Imaging System

Figure 1:
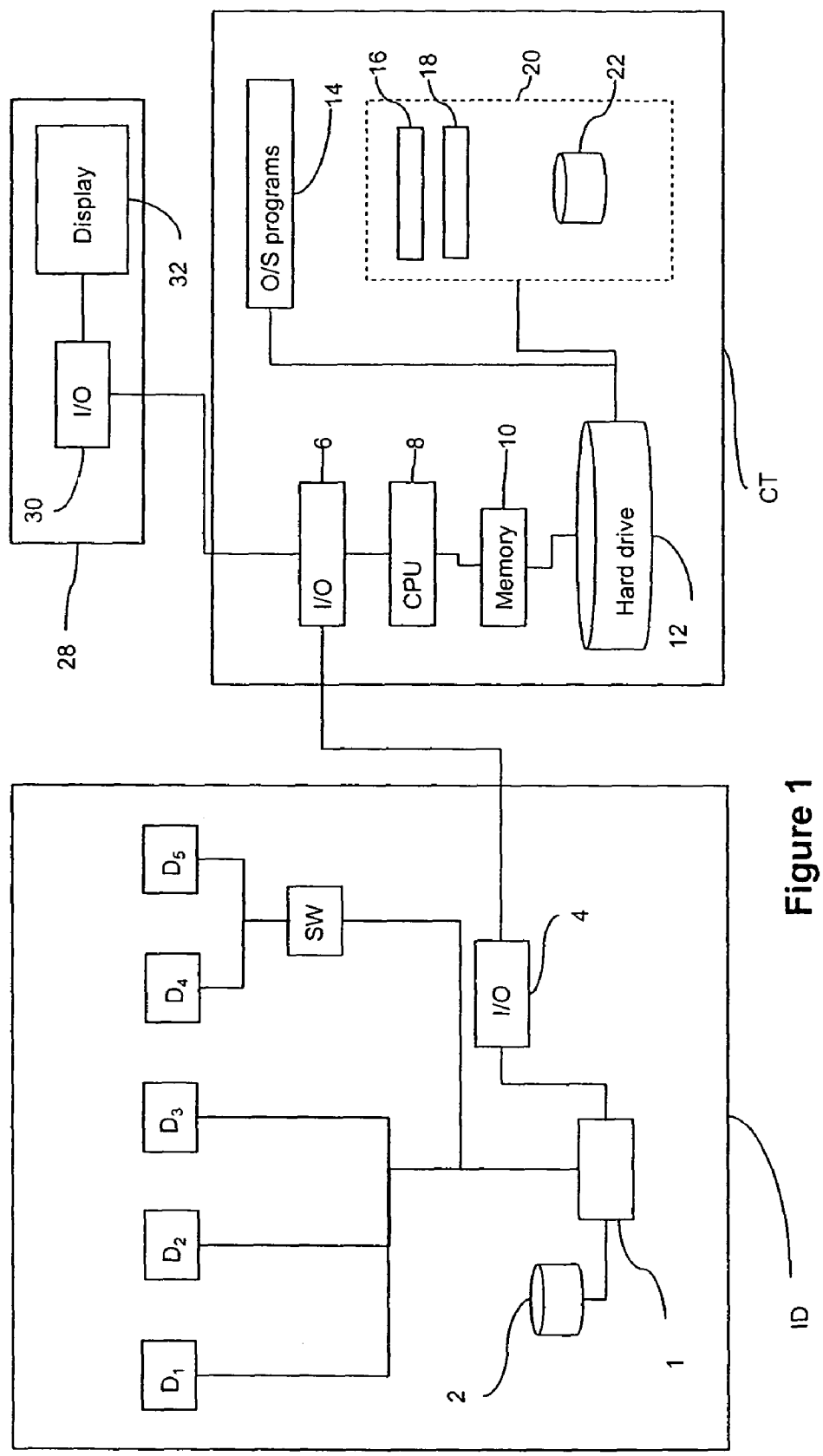
FIG. 1 is a schematic illustration showing data processing components in an imaging system arranged in accordance with an embodiment of the invention.

The imaging system will be described with reference to FIG. 1 which shows a schematic illustration of data processing components of an imaging system arranged in accordance with the invention. The system includes an imaging device ID, such as a confocal microscope, as described in further detail below, which includes detectors $D_1$, $D_2$, $D_3$, $D_4$, $D_5$, a switch SW, a control unit 1, an image data store 2 and an Input/Output (I/O) device 4. An associated computer terminal CT includes a central processing unit (CPU) 8, memory 10, a data storage device such as a hard disc drive 12 and I/O devices 6 which facilitate interconnection of the computer CT with both the imaging device ID via the I/O device 4, and a display element 32 of a screen 28 via a screen I/O device 30. Operating system programs 14 are stored on the hard disc drive 12 and control, in a known manner, low level operation of the computer terminal CT. Program files and data 20 are also stored on the hard disc drive 12, and control, in a known manner, outputs to an operator via associated devices and output data stored on the hard disc drive 12. The associated devices include the display 32 as an element of the screen 28, a pointing device (not shown) and keyboard (not shown), which receive input from, and output information to, the operator via further I/O devices (not shown). Included in the program files 20 stored on the hard drive 12 are an assay control application 16, an image processing and analysis software system 18, and a database 22 for storing image data received from the imaging device ID and output files produced during data processing. The image analysis software system 18 may be a customized version of known image processing and analysis software packages.

The performance of an assay using the imaging device ID is controlled using control application 16, and the image data are acquired. After the end of acquisition of image data for at least one well in a multi-well plate by at least one detector $D_1$, $D_2$, $D_3$ the image data are transmitted to the computer terminal CT and stored in the database 22 on the computer terminal hard drive 12, at which point the image data can be processed using the image processing and analysis software system 18, as will be described in greater detail below.

Figure 2:
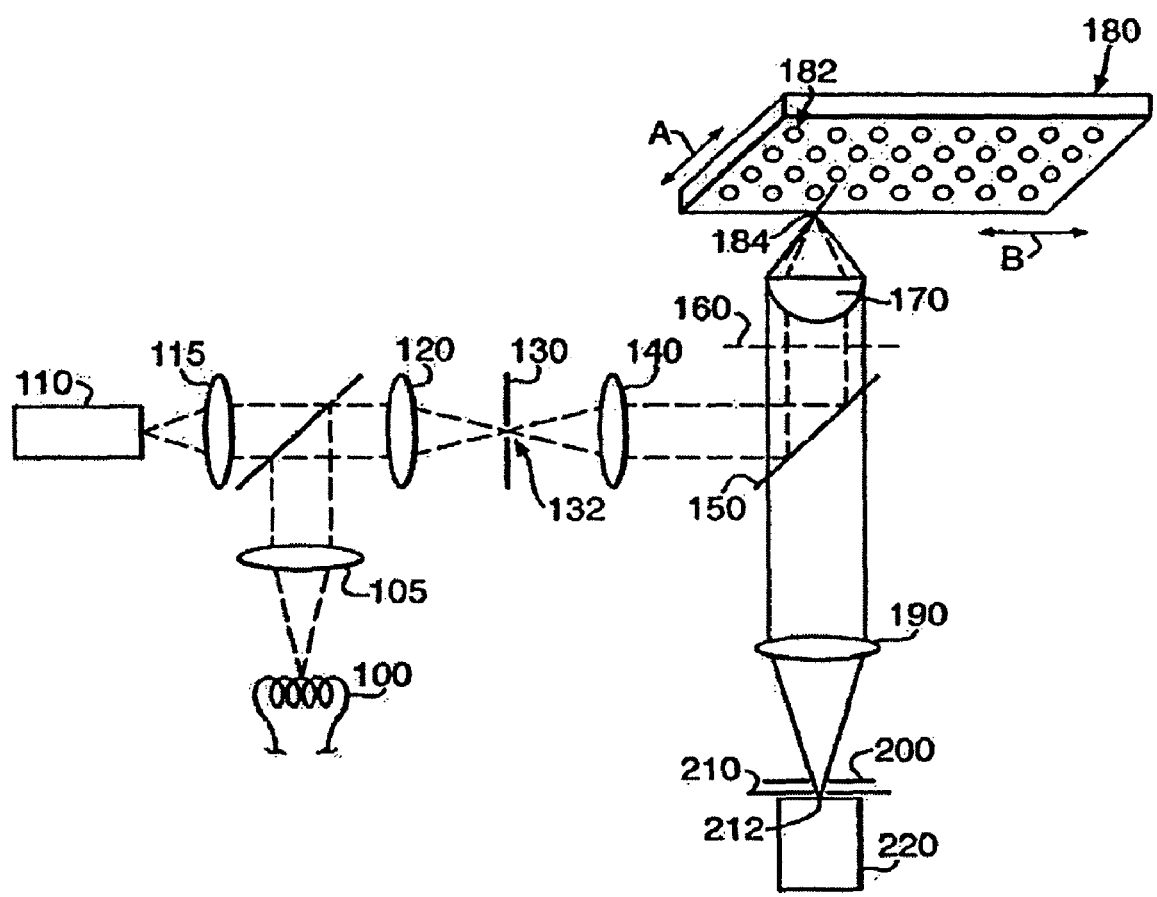
FIG. 2 is a schematic view of a first embodiment of a line-scan confocal microscope used to image samples according to the present invention.

FIG. 2 shows an embodiment of the present invention, where the imaging device ID used is a confocal microscope based on the Amersham Biosciences IN Cell Analyzer™ system. The microscope comprises a source 100 or 110 of electromagnetic radiation for example, in the optical range, 350-750 nm, a cylindrical lens 120, a first slit mask 130, a first relay lens 140, a dichroic mirror 150, an objective lens 170, a multi-well plate 180 containing a two-dimensional array of sample wells 182, a tube lens 190, a filter 200, a second slit mask 210 and a detector 220. These elements are arranged along optical axis OA with slit apertures 132, 212 in masks 130, 210 extending perpendicular to the plane of FIG. 2. The focal lengths of lenses 140, 170 and 190 and the spacings between these lenses as well as the spacings between mask 130 and lens 140, between objective lens 170 and multi-well plate 180 and between lens 190 and mask 210 are such as to provide a confocal microscope. In this embodiment, electromagnetic radiation from a lamp 100 or a laser 110 is focused to a line using a cylindrical lens 120. The shape of the line is optimized by a first slit mask 130. The slit mask 130 is depicted in an image plane of the optical system that is in a plane conjugate to the object plane. The illumination stripe formed by the aperture 132 in the slit mask 130 is relayed by lens 140, dichroic mirror 150 and objective lens 170 onto a multi-well plate 180 which contains a two-dimensional array of sample wells 182. For convenience of illustration, the optical elements of FIG. 2 are depicted in cross-section and the multi-well plate in perspective. The projection of the line of illumination onto multi-well plate 180 is depicted by line 184 and is also understood to be perpendicular to the plane of FIG. 2. As indicated by arrows A and B, multi-well plate 180 may be moved in two dimensions (X,Y) parallel to the dimensions of the array by means not shown.

An image of the sample area, for example a sample in a sample well 182, is obtained by projecting the line of illumination onto a plane within the sample, imaging the fluorescence emission therefrom onto a detector 220 and moving the plate 180 in a direction perpendicular to the line of illumination, synchronously with the reading of the detector 220. In the embodiment depicted in FIG. 2, the fluorescence emission is collected by the objective lens 170, projected through the dichroic beamsplitter 150, and imaged by lens 190 through filters 200 and a second slit mask 210 onto a detector 220, such as is appropriate to a confocal imaging system having an infinity-corrected objective lens 170. The dichroic beamsplitter 150 and filter 200 preferentially block light at the illumination wavelength. The detector 220 illustratively is a camera and may be either one dimensional or two dimensional. If a one dimensional detector is used, slit mask 210 is not needed. The illumination, detection and translation procedures are continued until the prescribed area has been imaged.

An embodiment enabling multi-wavelength fluorescence imaging is preferred for certain types of assays. In this way, image data can be generated for the same area being imaged in each of a plurality of different color channels simultaneously.

Figure 3A:
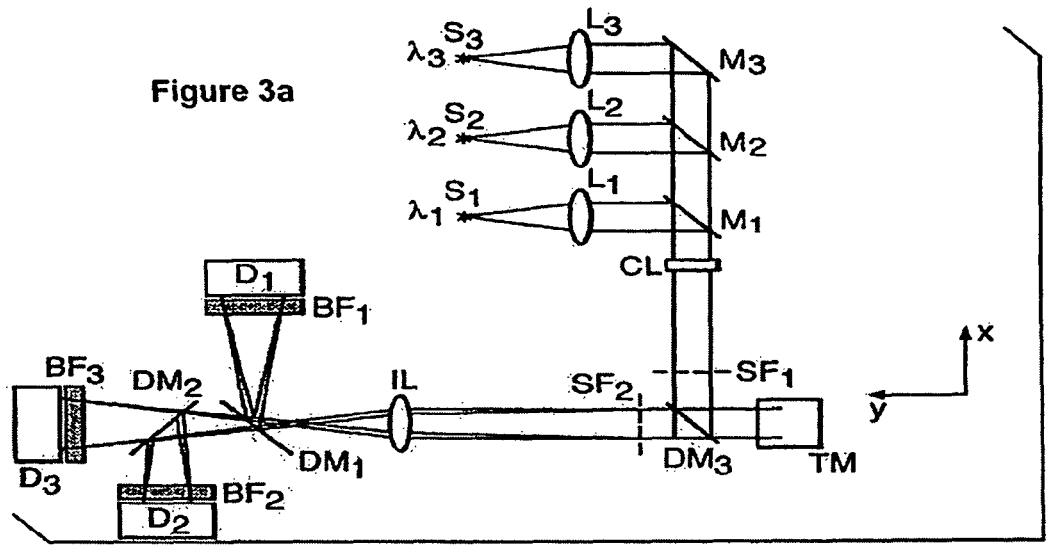
FIGS. 3A and 3B are, respectively, a top view and a side view of the ray path of a multicolor embodiment of the present invention, without a scanning mirror.
Figure 3B:
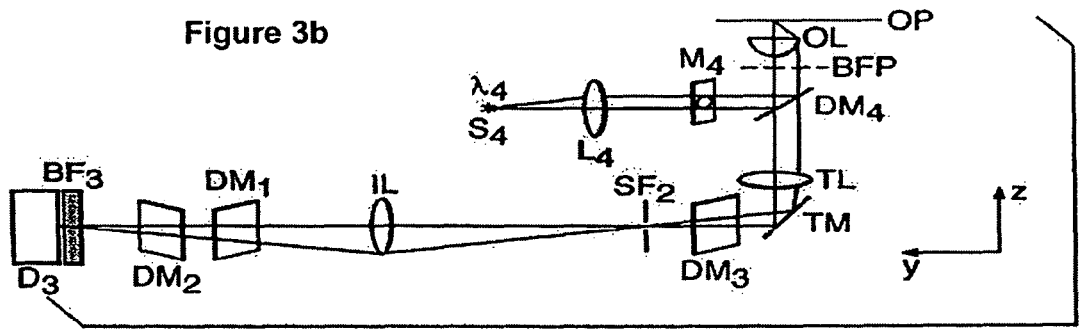
Figure 3C:
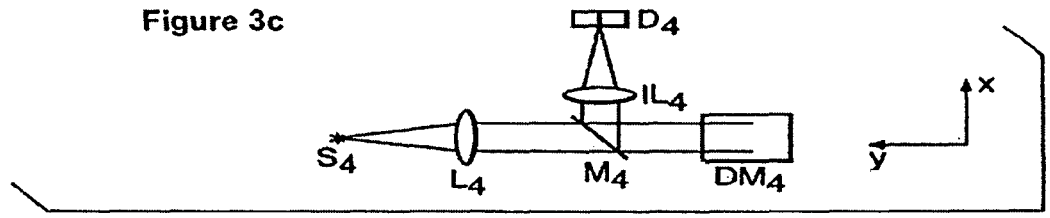
FIG. 3C is a top view of the ray path of a single beam autofocus.

The number of independent wavelengths or colors will depend on the specific assay being performed. In one embodiment three illumination wavelengths are used. FIGS. 3A and 3B depict the ray paths in a three-color line-scan confocal imaging system, from a top view and a side view respectively. In general, the system comprises several sources $S_n$ of electromagnetic radiation, collimating lenses $L_n$, and mirrors $M_n$ for producing a collimated beam that is focused by cylindrical lens CL into an elongated beam at first spatial filter $SF_1$, a confocal microscope between first spatial filter $SF_1$, and second spatial filter $SF_2$ and an imaging lens IL, beamsplitters $DM_1$ and $DM_2$ and detectors $D_n$ for separating and detecting the different wavelength components of fluorescent radiation from the sample. Spatial filters SF, and $SF_1$ and $SF_2$ preferably are slit masks.

In particular, FIG. 3A depicts sources, $S_1$, $S_2$ and $S_3$, for colours $\lambda_1$, $\lambda_2$ and $\lambda_3$, and lenses $L_1$, $L_2$ and $L_3$ that collimate the light from the respective sources. Lenses $L_1$, $L_2$ and $L_3$, preferably are adjusted to compensate for any chromaticity of the other lenses in the system. Mirrors $M_1$, $M_2$ and $M_3$ are used to combine the illumination colors from sources $S_n$. The mirrors $M_2$ and $M_1$ are partially transmitting, partially reflecting and preferentially dichroic. $M_2$, for example, should preferentially transmit $\lambda_3$, and preferentially reflect $\lambda_2$. It is thus preferential that $\lambda_3$ be greater than $\lambda_2$.

Operation of the microscope in a confocal mode requires that the combined excitation beams from sources $S_n$ be focused to a "line", or a highly eccentric ellipse, in the object plane OP. As discussed in connection to FIG. 2 above, a variety of configurations may be used to accomplish this. In the embodiment depicted in FIG. 3A, the combined illumination beams are focused by cylindrical lens CL into an elongated ellipse that is coincident with the slit in the spatial filter $SF_1$. As drawn in FIGS. 3A and 3B, the slit mask $SF_1$ resides in an image plane of the system, aligned perpendicular to the propagation of the illumination light and with its long axis in the plane of the page of FIG. 3A. The lenses TL and OL relay the illumination line from the plane containing $SF_1$ to the object plane OP. A turning mirror, TM, is for convenience. In another embodiment, $DM_3$ is between TL and OL and CL focuses the illumination light directly into the BFP. Other embodiments will be evident to one skilled in the art.

Referring to FIG. 3B, the light emitted by the sample and collected by the objective lens, OL, is imaged by the tube lens, TL, onto the spatial filter, $SF_2$. $SF_2$ is preferentially a slit aligned so as to extend perpendicular to the plane of the page. Thus, the light passed by filter $SF_2$ is substantially a line of illumination. $SF_2$ may be placed in the primary image plane or any plane conjugate thereto. $DM_3$ is partially reflecting, partially transmitting and preferably "multichroic". Multi-wavelength "dichroic" mirrors or "multichroic" mirrors can be provided that preferentially reflect certain wavelength bands and preferentially transmit others.

Here, $\delta\lambda_1$ will be defined to be the fluorescence emission excited by $\lambda_1$. This will, in general, be a distribution of wavelengths somewhat longer than $\lambda_1$. $\delta\lambda_2$ and $\delta\lambda_3$ are defined analogously. $DM_3$ preferentially reflects $\lambda_n$, and preferentially transmits $\delta\lambda_n$, n=1, 2, 3. The light transmitted by $SF_2$ is imaged onto the detection devices, which reside in planes conjugate to the primary image plane. In FIG. 3A, an image of the spatial filter $SF_2$ is created by lens IL on all three detectors, $D_n$. This embodiment is preferred in applications requiring near-perfect registry between the images generated by the respective detectors. In another embodiment, individual lenses $IL_n$ are associated with the detection devices, the lens pairs IL and $IL_n$ serving to relay the image of the spatial filter $SF_2$ onto the respective detectors $D_n$. The light is split among the detectors by mirrors $DM_1$ and $DM_2$. The mirrors are partially transmitting, partially reflecting, and preferentially dichroic. $DM_1$ preferentially reflects $\delta\lambda_1$ and preferentially transmits $\delta\lambda_2$ and $\delta\lambda_3$. The blocking filter, $BF_1$, preferentially transmits $\delta\lambda_1$ effectively blocking all other wavelengths present. $DM_2$ preferentially reflects $\delta\lambda_2$ and preferentially transmits $\delta\lambda_3$. The blocking filters, $BF_2$ and $BF_3$, preferentially transmit $\delta\lambda_2$ and $\delta\lambda_3$ respectively, effectively blocking all other wavelengths present.

Image Processing and Analysis

In general, the development of an image analysis protocol for the analysis of the image data in accordance with the invention involves a number of steps. In the following, an example of a set of images in which two interrelated target sets of image objects are to be analysed is given. However, it should be understood that a similar procedure for defining an image analysis protocol may be used for three, or more, interrelated target sets of image objects.

A marker, producing fluorescence at a predetermined wavelength, is preferably used to identify each image object under analysis in the image data. For example, in the case of a nuclear image object, a nuclear marker such as one of the toxic intercalating nuclear dyes (such as DRAQ5™ or a Hoechst™ dye, for example Hoechst 33342) may be used. Alternatively, non-toxic markers such as an NLS-fluorescent protein fusion may be used. For example, the Clontech™ pHcRed1-Nuc vector, when transfected into a cell line in accordance with the present invention, produces a red fluorescence signal in the nucleus. Other known fluorescent markers can be used to mark other areas, such as the cell cytoplasm, in a different color channel.

A set of such cells may be placed in a number of different wells of a multi-well plate, different chemical compounds placed in each well, and, at a desired time following the addition of the chemical compounds, image acquisition can be performed. During image acquisition, a first image of the first image objects can be acquired in a first channel corresponding to the marker used for the first image objects, a second image of the second image objects can be acquired in a second channel corresponding to the marker used for the second image objects, and the two images are co-registered such that the pixels of each image are aligned. This is saved in a file known as an image stack. An image stack is a collection of images that logically belong together for analysis purposes. In most cases, a given image stack will contain images that share a common acquisition.

Figure 4:
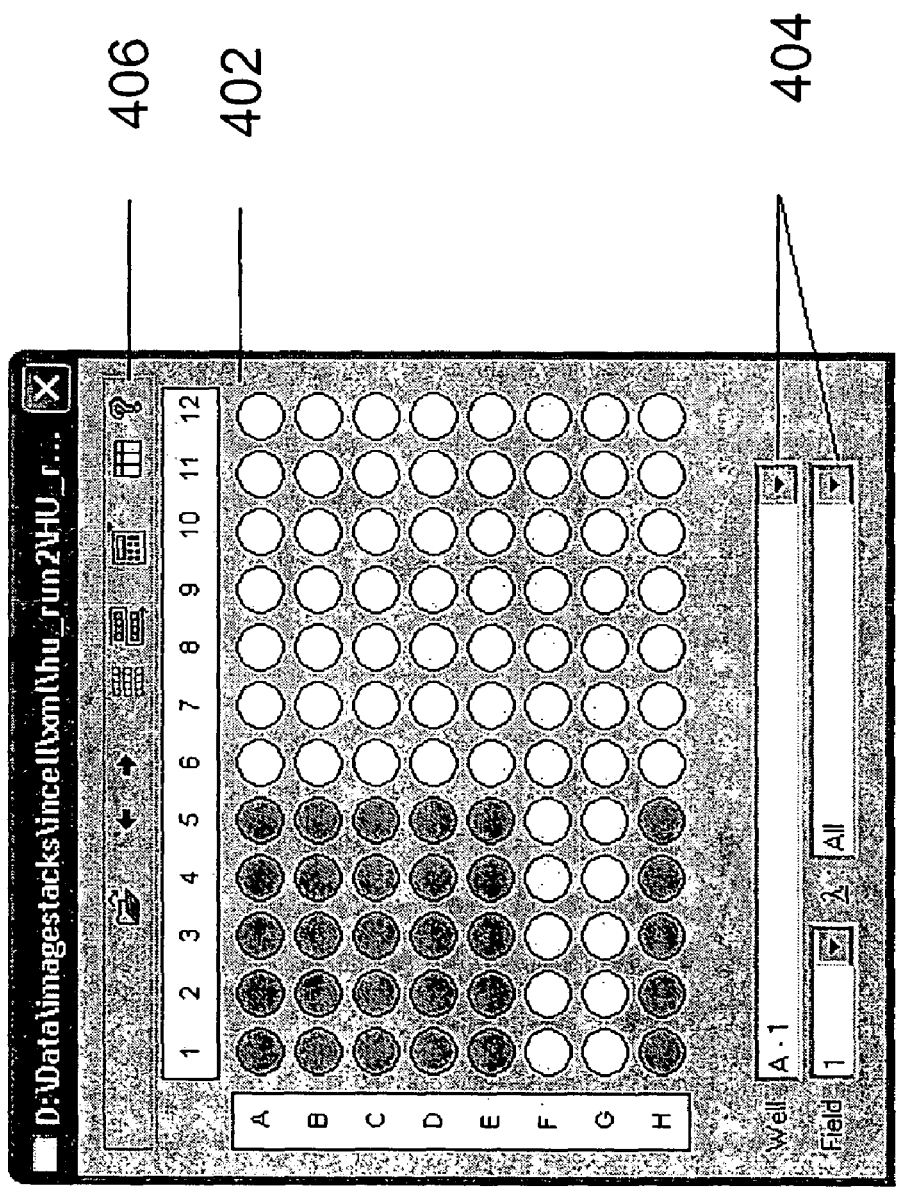
FIG. 4 is a screenshot of a plate map according to an embodiment of the invention.

Initially, an image stack will be presented by means of the image analysis software system of the invention as a plate map view, as illustrated in FIG. 4. There are three main features to this view. First, there is the plate map 402, which represents the multi-well plate from which the image data were acquired. A colored well indicates that an image, or a set of images, was acquired for that well, whereas a white well indicates that nothing was acquired. Clicking on a colored well will cause the application to display the images acquired for that well. A set of drop-down selection lists 404 allows the user to alter the well, field and channel(s) currently selected on the plate map 402.

At the top of the plate map view, a function bar 406 is provided, which contains activation buttons for various image stack related functions. A file selection dialog can be used to find and open a new image stack file. A view of the new image stack will replace the one currently being viewed. Navigation buttons allows the user to navigate between sets of images in a series and display them. Depending on how the images were acquired, this may be the previous or next well, or it may be the previous or next field within the current well.

An image analysis button can be selected to start an analysis of the currently selected image data of the image stack. The current image data can be analysed by applying a user-defined image analysis protocol, or an image analysis protocol built in to the image analysis software system. To begin an analysis, the analysis function is activated, and an analysis menu appears. The image analysis protocol to be applied is selected using the analysis menu. Once the image analysis protocol is selected, analysis begins; the results of the analysis, in terms of measurements obtained can be displayed to the user and/or output to a data file for further analysis.

Figure 5:
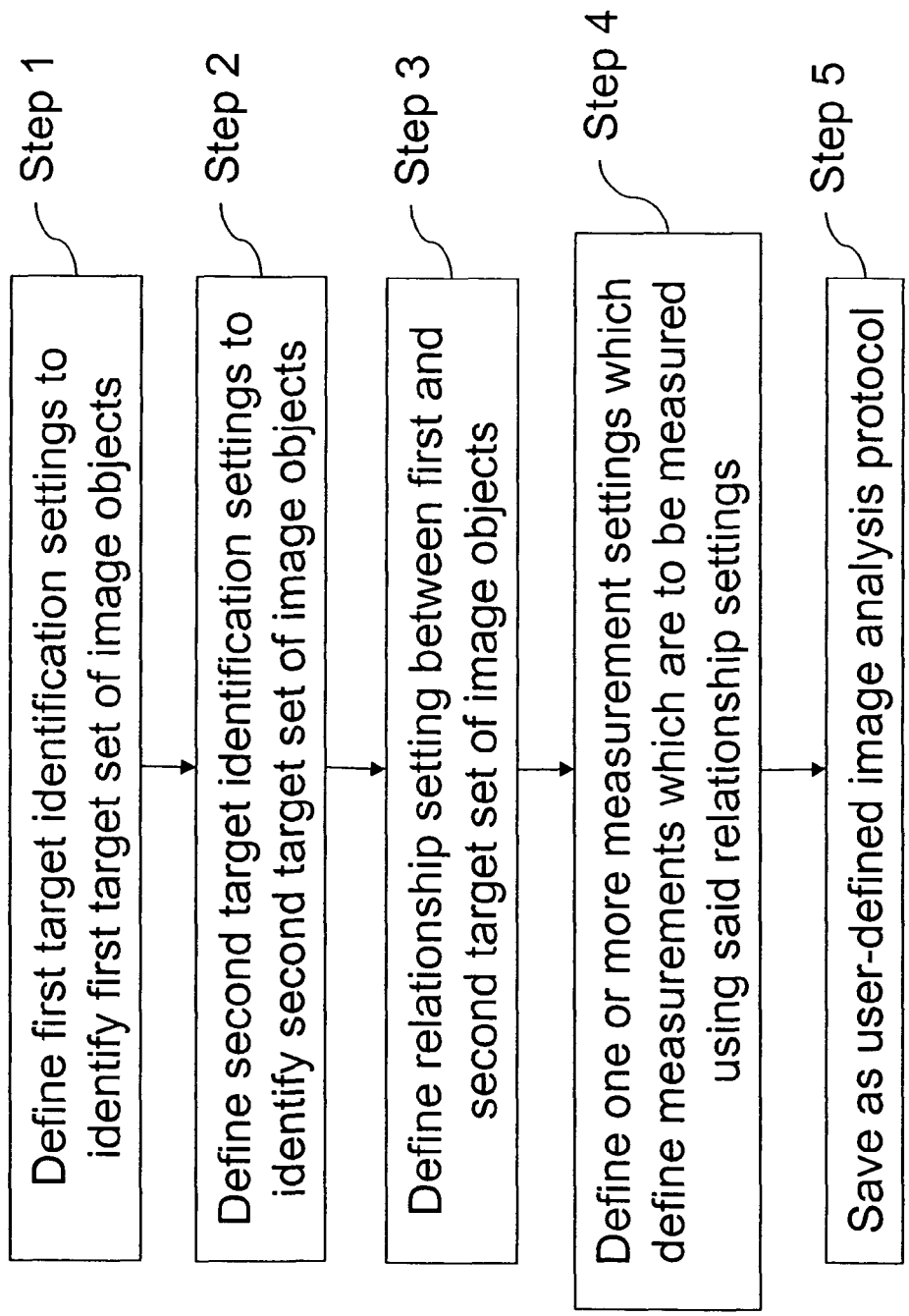
FIG. 5 is a flow diagram showing a method of cell classification according to an embodiment of the invention.

FIG. 5 is a flow diagram illustrating, at a high level, steps carried out by a user according to an embodiment of the invention. Image data from a selected cell population, for example cells in a given field of view in a single well, are collected by the image analysis software system. The image analysis protocol to be used is developed by a user via a graphical user interface provided by the image analysis software system. At any point during the development, the user can judge the performance of the image analysis protocol being developed through an operation preview feature.

In Step 1, the user defines first target identification settings to identify first target set of image objects. The term "target set" is used to refer to a collection or group of individual image objects of interest, i.e. targets, which are obtained from the images to be analysed. All of the targets in a target set are of the same type. In a biological application, examples of target sets could be granules, nuclei, cell bodies, etc.

The user-defined first target identification settings can include image pre-processing settings, object segmentation settings and image post-processing settings.

The user can first select one or more pre-defined image pre-processing algorithms to be applied before segmentation, including a pre-processing macro (user defined), flat field correction, de-noising (3 modes) and shading removal.

The user can next select a segmentation algorithm from a set of pre-defined segmentation algorithms, including an object segmentation, an intensity segmentation, a vesicle segmentation, a nuclear segmentation and a cytoplasm segmentation.

After selecting the segmentation algorithm, the user can define options for the selected segmentation algorithm, and define the image channel in which segmentation is to be applied.

The user can next select one or more pre-defined image post-processing algorithms to be applied after segmentation, including a post-processing macro (user defined), sieving, object de-clumping, and erosion or dilation of the segmented image objects.

It is possible to filter a target set using what are referred to herein as acceptance criteria. Using this function, measurements can be performed on each target, and will eliminate any targets that do not match the criteria. For example, it is possible to specify a minimum or maximum area for the targets, using an acceptance criteria definition dialog box (not shown). To construct logical target criteria, the number, symbol, and mathematical operation data entry functions are used in combination with a selectable list of spatial measure categories or densitometric measure categories.

Any number of measurements, including both primitive and user-defined measurements, to be discussed in further detail below, may be used to define acceptance criteria. Suppose, for example, that the user wishes to count image objects that are between 100 and 200 $\mu m^2$ in size. The available measures allow the user to access, inter alia, the 'Area' measure. The user can then select the 'Area' measure and other data input functions to construct the statement:

"[Area]>100 & [Area]<200"

If the features of interest were round the user could also, for example, use the 'Form Factor' measure to construct the statement:

"[Form Factor]>0.8"

At Step 2, the user defines second target identification settings to identify second target set of image objects. These user-defined second target identification settings are selected from the same image pre-processing, object segmentation and image post-processing options available when defining the first target identification settings in Step 1, as described above.

At Step 3, the user defines relationship settings between first and second target set of image objects. This procedure, referred to herein as "target linking", will be described in further detail below.

In Step 4, the user defines one or more measurement settings which are to be measured using the relationship setting. These measurements are taken from the image data, based on the relationship settings. These measurements may relate to one or more morphometric characteristics, densitometric and/or texture-based characteristics of the image objects represented in the image data. Both primitive measurements and user-defined measurements are selectable, as will be described in further detail below.

In Step 5, the settings defined in Steps 1 to 4 are stored as a user-defined image analysis protocol.

Figure 6:
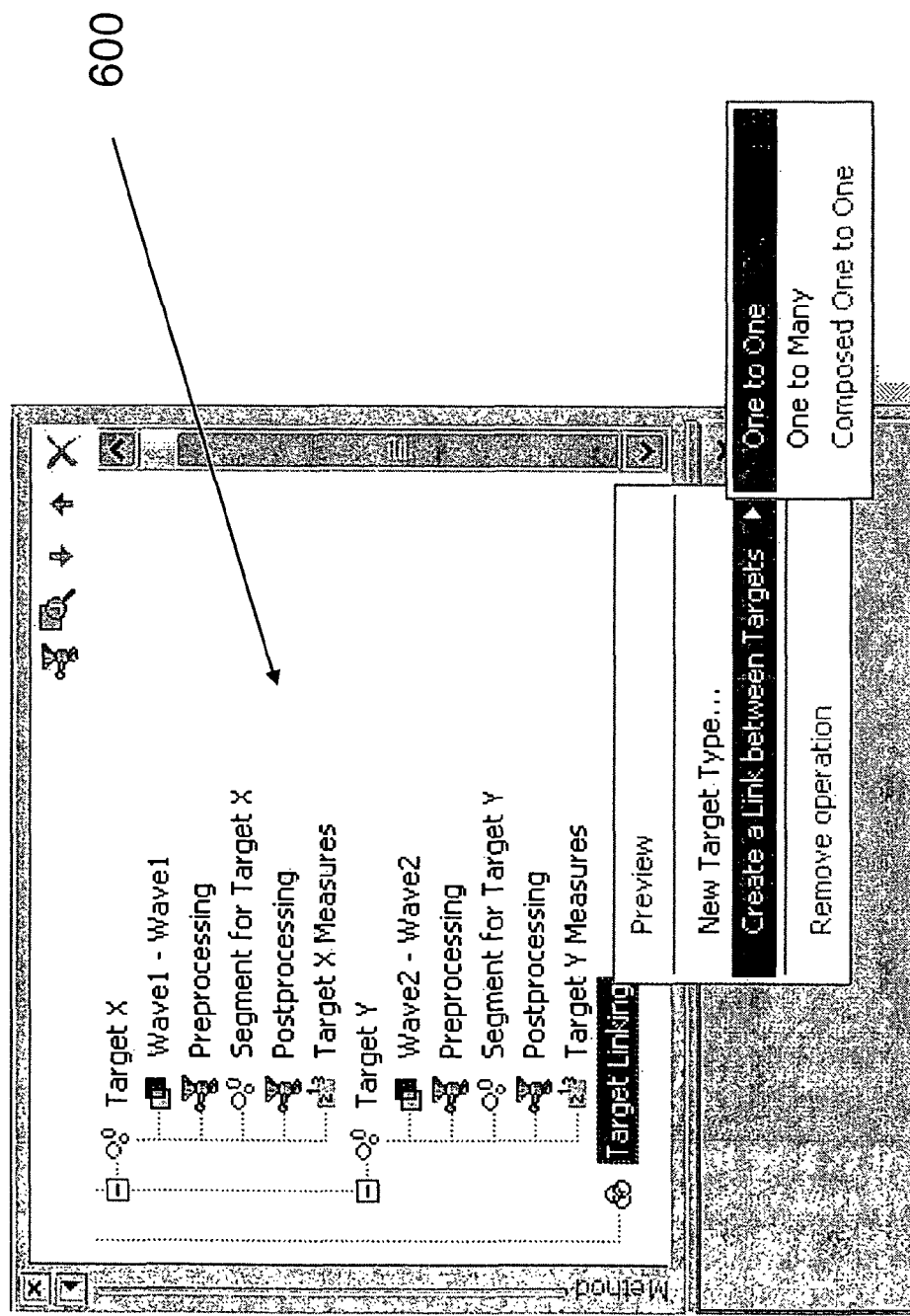
FIG. 6 is a screenshot of a main user interface for defining and linking target sets according to an embodiment of the invention.

FIG. 6 illustrates the tree-view 600 which allows a user to alter each of the settings in Steps 1 to 4. Note that Steps 1 to 4 do not have to be performed in the order illustrated in FIG. 5. In this example, the user has defined two individual target sets, "Target X" and "Target Y". A separate dialog box (not shown) allows the users to define the target set names, and acceptance criteria, as described above, for each target set.

By selecting each of an image selection node (here named as "Wave1-Wave1" and "Wave2-Wave2" respectively), a pre-processing node, a segmentation node and a postprocessing node, the user is able to define the target set identification settings for each target set.

By selecting a target linking node, as shown in FIG. 6, the user is able to create a link between each user-defined target set, as described in further detail below.

Linking Target Sets

A linked target set, also referred to herein as a target link, is a way to combine individual targets pair-wise from two target sets into a set of interrelated targets. This makes it possible to perform complex or composite measurements on these new targets, such as finding a ratio between average intensity measures of the two constituent elements of the linked target set. Two relatively simple examples of the use of linked target sets, in biological applications, are:

a) Linking nuclei and cell bodies to obtain an average intensity ratio measure as in a nuclear translocation study.

b) Linking cell bodies and granules together to obtain a count of granules per cell body.

The target links may be one of a number of different types. A 'One to One' target link combines two target sets and will match each target of the primary target set with exactly one target in the secondary target set according to user-defined criteria. If there are multiple secondary targets that could be matched with the primary target, only the first secondary target is matched with the primary target.

Figure 7:
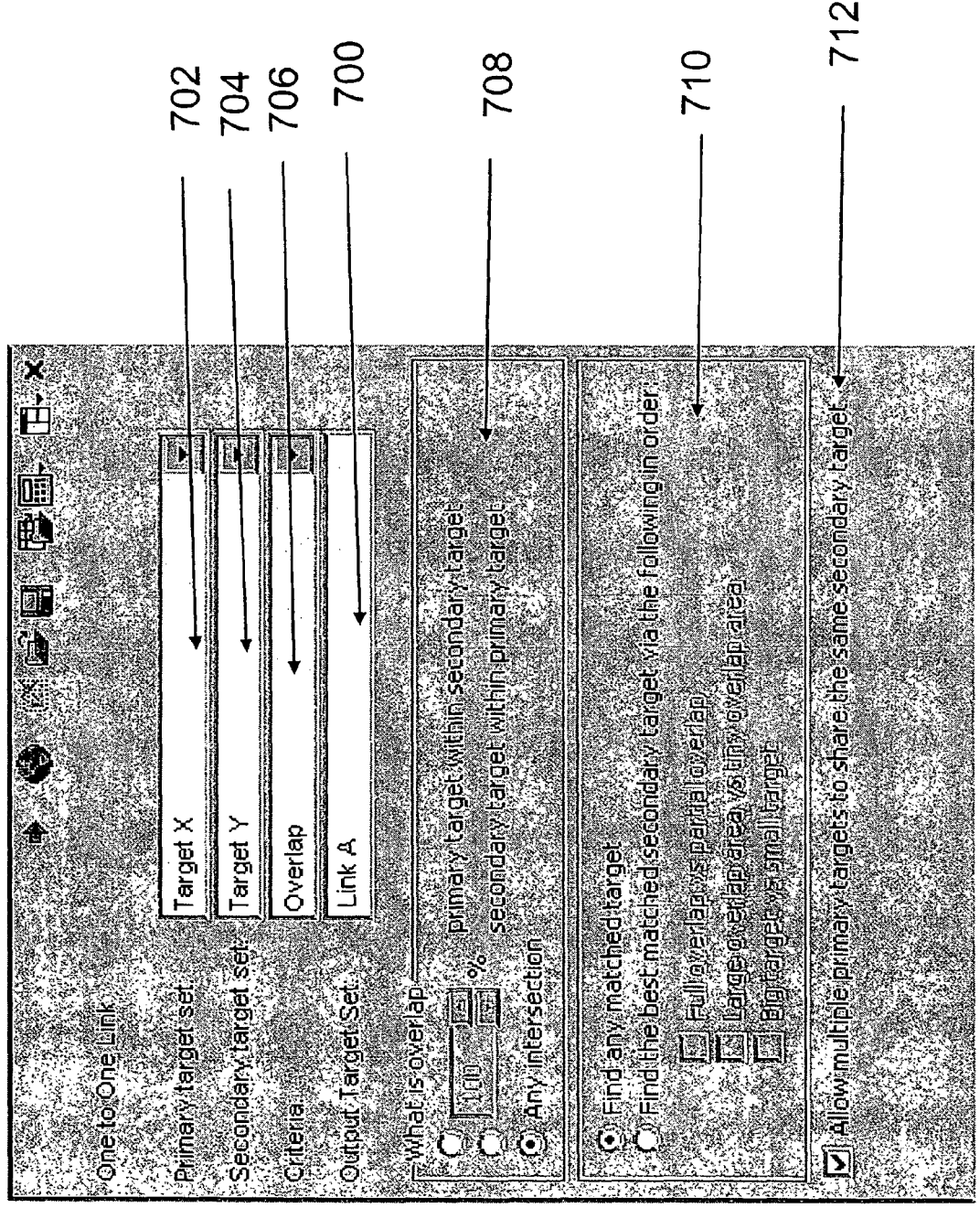
FIG. 7 is a screenshot of a user interface for defining settings for linking target sets according to an embodiment of the invention.

To define a 'One to One' target link, at least two target sets must already be defined. Defining a new 'One to One' target link involves the following steps:

1. The user selects the Target Linking item in the tree view and selects "Create a Link between Targets→One to One". The dialog box illustrated in FIG. 7 then opens.

2. In the dialog box that opens, the user types in a new name for the linked target set in the edit field 700.

3. It is possible to edit a number of parameters:
   a) "Primary target set": This field 702 allows the user to select the target set where the first target in the pairing will be found.
   b) "Secondary target set": This field 704 allows the user to select the target set where the second target in the pairing will be found.
   c) "Criteria": This field 706 allows the user to select that the target set Targets can only be linked together when they satisfy a predetermined linking criterion, such as a spatially based criterion. The most useful criterion is overlap, although this overlap could be by as little as one pixel. Further criteria may be used such as a proximity of Targets to each other, defined for example by a maximum number of pixel spacings.
   d) "What is overlap": This field 708 allows the user to define the degree to which the two targets must overlap. Any degree of overlap value between 0% and 100% is available as a selection.

For example, if the user only wants to allow targets to be linked if the secondary target is completely within the primary target, the user would set the options so as to specify:

'100% secondary target within primary target'

At the other extreme, if 'Any intersection' is selected (as shown), the two targets need only overlap by one pixel to be linked together.

e) "Matching criteria": This field 710 allows the user to define the target sets used if the 'One to One' target link would have multiple secondary targets per primary target. It is important to decide how to resolve any conflicts so that only one secondary target is linked to each primary target. If 'Find any matched target' is selected, the first secondary target that can be linked to the primary target is chosen. Targets are ordered as they are found in the image according to a pre-defined scanning procedure, e.g. from left to right and top to bottom. If the users wants to use some criteria, the user can choose to accept the targets based on 'Full overlap versus partial overlap' (accept the first fully overlapping target rather than a partially overlapping target), 'Large overlap area versus small overlap area' (pick the target with the largest overlap area), and 'Large target versus small target' (pick the largest target that meets the overlap criteria).
   f) "Allow multiple primary targets to share the same secondary target": While each primary target will only be matched with one secondary target, it is possible for these primary targets to share the secondary target, if it is the best match for both primary targets based on the criteria set out above. If this check box 712 is selected, this is allowed. If it is not selected, the first primary target to claim a secondary target has an exclusive link to that secondary target. Even if that secondary target is the best match for another primary target, it must be linked with a different secondary target.

If more than one secondary target should be matched to the primary target, a 'One to Many' link can be constructed, as described in further detail below. A 'One to Many' target link combines two target sets and will match each target of the primary target set with one or more targets in the secondary target set according to user-defined criteria. To define a 'One to Many' target link, at least two target sets must already be defined. Defining a new 'One to Many' target link involves the following steps:

1. The user selects the Target Linking item in the tree view and selects "Create a Link between Targets→One to Many".

2. In the dialog box that opens, the user types in a new name in the edit field beside 'Output Target Set'.

3. It is possible to edit a number of parameters, including those described above in relation to the creation of a 'One to One' target link, other than the "Matching criteria" parameter.

A 'Composed One to One' target link combines two target links and will match each target of the primary target link with exactly one target in the secondary target link according to user-selected relationship criteria. Defining a new 'Composed One to One target link involves the following steps:

1. The user selects the Target Linking item in the tree view and selects "Create a Link between Targets Composed One to One".

2. In the dialog box that opens, the user types in a new name in the edit field beside 'Output Target Set'.

3. It is possible to edit a number of parameters, including those described above in relation to the creation of a 'One to One' target link, except in this case the primary and secondary target sets are previously defined target links. There are two further parameters for the 'Composed One to One' link and these are:

g. "Primary matching path"; and
   f. "Secondary matching path": When a 'Composed One to One' link is generated, it is necessary to match the targets from the primary target link to the targets in the secondary target link. The Primary and Secondary matching paths provide a mechanism for doing this.

In a 'Composed One to One' link, one primary target is matched with one secondary target. However, it is not possible to measure the overlap between two target links. Instead, the overlap is measured between one target set from each target link. It is important that the user selects target sets which do overlap in order to create the 'Composed One to One' link.

Defining Measurements

There are a variety of measurement definition options. The user can select from a library of primitive morphological, densitometric and texture-based measures. The densitometric measures include gray level intensity, optical density, and a number of specialized measures that automatically exclude outlier pixels from the calculation. The morphometric measures include area, length, diameter, etc. The user can also select from, or define, user-defined measures.

The procedure for defining measurements to be used in an image analysis protocol is as follows:

1. The user selects the "Measures" node under the desired target set (see FIG. 6).

2. Options for defining and selecting measurements appear in a "Reporting" dialog box. The dialog displays all selectable measures, including primitive measures and user-defined measures, for the target set. It also contains controls for specifying the image(s) from which to make the measurements, and options for generating summary statistics.

3. To select an existing measure from the measurement library, the user selects an option on the reporting dialog to select "Add" from a menu of options.

4. The user selects the measure from a "Measures Selections" dialog box.

5. To create a user-defined measure, the user selects an option on the reporting dialog to select "Add User-defined" from a menu of options. The user then uses an equation editor, to be described in further detail below, to construct the user-defined measure.

6. Selected and defined measures appear in the reporting dialog.

7. The user then selects the image from which to make each measurement. Note that the image need not be the same image used for target segmentation. If they are different, target outlines will be copied from the segmentation image to the specified measurement image. Measurements are subsequently made from pixels within the copied target outlines.

8. The user then repeats the procedure for any other target sets.

When the images are analyzed, measures appear as separate columns in the data table. A value is calculated for each individual target in the target set.

A variety of summary statistics can be generated for any measure listed in the reporting dialog. Summary statistics include Count, Sum, Maximum value, Minimum value, Mean, Median, and Standard Deviation, where n=number of individual targets in the target set.

To generate a summary statistic, the user selects a "Statistical Function" field and selects a statistic from a menu of options.

When the image is analyzed, data from individual targets will be replaced with the selected summary statistic. If the user wishes to report individual measures as well as the summary statistic, the user adds the measure twice and configures one of the entries as a summary statistic. The user creates multiple entries if the user wishes to generate more than one summary statistic.

Selecting Existing Measures

The user can select an existing measure from the measurement library, using a "Measures Selection" dialog box (not shown). The dialog box includes a list of "Available Measures" categories. When the user opens a category and chooses a measurement, it appears in a "Selected Measures" list. Adding a measure to the list of selected measures configures the image analysis software system to conduct that measure in relation to each target set for which the measure has been selected. For example, adding the 'Area' measure to the list of selected measures configures the software to measure the area of all targets in the relevant target set.

When the image(s) is analyzed, data from individual targets are displayed in an individual column in the output data table, in accordance with the list of selected measures.

Available measures are grouped into different categories, as detailed below. In the following definitions, a "target outline" is a region of interest defined by the outline of a segmented target.

I. Density Measures i) Dens—Density. Mean density value of the pixels contained within the target outline.

ii) Median Dens—Median Density. Median density value of all the pixels contained within the target outline.

iii) Mode Dens—Mode Density. Most common density value contained within the target outline.

iv) MTM Dens—Median-based Trimmed Mean Density. Mean of all the pixels after removing pixels with density values that exceed four median absolute deviations (MADs; see below) above or below the median. This measure removes the influence of image artifacts (e.g., dust particles) on density estimation.

v) ARM Dens—Artifact Removed Mean Density. Mean density of all the pixels in the target after removing pixels with density values greater than four median absolute deviations (MADs) above the median. This measure removes the influence of image artifacts (e.g., dust particles) on density estimation.

vi) Standard Deviation—The density value reported may be the mean of the pixel densities for a target outline or a standard deviation (SD) of pixel densities for each target outline.

vii) The Median of Absolute Deviation (MAD) is a measure of variation around the median density value (i.e., around the median density value of all the pixels contained within a target). It is the median of the absolute values of deviations from the median density (i.e., the absolute values of pixel densities—median density).

II. Density Related Measures i) D×A—Density×Area. Mean density (in current density unit) within the target outline multiplied by its area (i.e., D×A=total density within the target outline). This measure may be used to estimate "total signal" intensity associated with a given target.

ii) AR D×A—ARM Density (in current density unit) multiplied by area of the target (in current spatial unit). ARM Density is the mean of all the pixels in a target, after first removing pixels with density values that exceed four median absolute deviations (MADs) above the median, and replacing them with estimated values. Estimated values are derived by interpolation from neighboring pixels.

III. Basic Morphometry Measures i) Area—Developer calculates area by counting pixels inside target outline borders. Pixels underneath the border itself are not included.

ii) Perimeter—Perimeter is the length of the target's outer boundary.

iii) tPerimeter—Total perimeter. Length of the target's outer boundary plus the length around any inner holes or spaces contained within it.

iv) Clipped perimeter—Clipped perimeter is useful when target outlines touch the edge of the image. Pixels that touch the edge of the image are excluded from the perimeter calculation.

v) Clipped tPerimeter—Clipped total perimeter. Total perimeter minus the length of any border (inner or outer) that touches the edge of the image.

vi) Length—Length is the maximum distance across a target and is a measurement that is allowed to cross target boundaries. In an S-shaped target, length is the straight line distance from tip to tip of the S.

vii) Feret diameters—Feret diameters are the maximum distances of the X (horizontal) and the Y (vertical) axes.

viii) Form factor—Form factor is a standard estimate of circularity that relates perimeter length to area. The more convoluted (and longer) the perimeter, the less circular the target. This measurement varies from 0 and 1, with 1 being a perfect circle.

ix) Weighted Relative Moment of Inertia—Index of the homogeneity of gray levels within a circular target. A value of 1 indicates the target is relatively homogeneous. If >1, the target has a higher proportion of bright pixels in its center. If <1, the target has a higher proportion of bright pixels around its perimeter.

x) Major Axis Length—Length of a target's major axis (i.e., the longer of two perpendicular axes of symmetry).

xi) Minor Axis Length—Length of target's minor axis (i.e., the shorter of two perpendicular axes of symmetry).

xii) Major Axis Angle—Angle of target's major axis, relative to horizontal.

IV. Chord Measures

The chord is the maximum distance (that does not cross a boundary) across the inside of a target. Both straight line and curvature-following chords are available.

V. Diameter Measures

The diameter is an internal distance perpendicular to the curved chord. In circular targets, the chord and the diameter are identical. In elongated targets, the diameter is a measure of width and the chord is a measure of length.

i) Average Diameter—Mean internal distance perpendicular to the curved chord.

ii) Median Diameter—Median internal distance perpendicular to the curved chord.

iii) Maximum Diameter—Maximum internal distance perpendicular to the curved chord.

iv) Circular Diameter—Diameter of a circle whose area is equivalent to the area of the target.

VI. Position Measures

Position measures may be expressed in linear scales (e.g., um). Uncalibrated position measures are expressed as pixel coordinates.

i) Pos X—Horizontal (X axis) coordinate of the target's center of mass, relative to the left side of the image.

ii) Pos Y—Vertical (Y axis) coordinate of the target's center of mass, relative to the bottom of the image.

iii) wPos X—Horizontal (X axis) coordinate of the region of interest, weighted for density (i.e., toward darker pixels).

iv) wPos Y—Vertical (Y axis) coordinate of the region of interest, weighted for density (i.e., toward darker pixels).

v) wPos X min—wPos X, after first subtracting the lowest density value contained within the region of interest.

vi) wPos Y min—wPos Y, after first subtracting the lowest density value contained within the region of interest.

VII. Scan Area Measure

A Scan Area measure is used for automated scanning of targets.

i) Count—The number of targets/grains contained within the region of interest.

VIII. Fiber-Related Measures i) Fiber length—Total length within a single fibrous shape.

ii) End Nodes—Number end points in a single fibrous shape.

iii) Branch Nodes—Number of bifurcations within a single fibrous shape.

iv) Crossing Points—Number of intersections within a single fibrous shape. Bifurcations are not included.

v) Total Area Fiber Length—Total length of all fibrous shapes within a scan area.

vi) Total Area End Nodes—Total number of end points in all fibrous shapes within a scan area.

vii) Total Area Branch Nodes—Total number of bifurcations in all fibrous shapes within a scan area.

viii) Total Area Crossing Points—Total number of intersections in all fibrous shapes within a scan area. Bifurcations are not included.

ix) Fiber Relative Moment of Inertia—Relative measure of fiber dispersion within a single fibrous shape. A value of "1" indicates little or no branching away from the center of the object. A value less than "1" indicates that branching occurs closer to the center of the object. A value greater than one indicates that branching occurs further away from the center of the object. The higher the number, the greater the distance from the center.

IX. User-Defined Measures

User-defined measures, already created for the current image analysis protocol, may also be selected.

Figure 8:
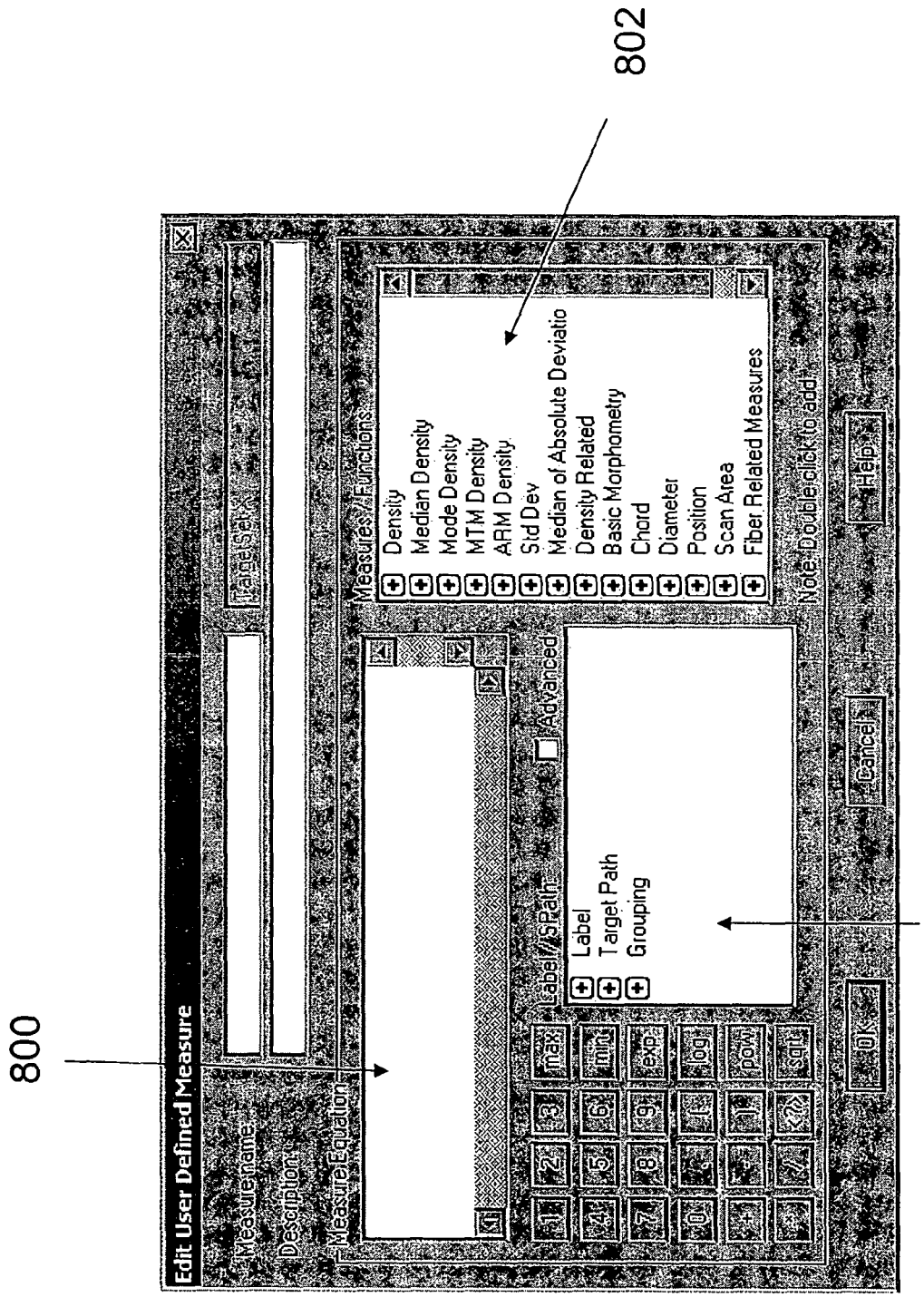
FIG. 8 is a screenshot of a user interface for defining user-defined measurements according to an embodiment of the invention.

User-defined measures are created using a measurement equation editor, of which the user interface is illustrated in FIG. 8. The user can use the equation editor to create novel measures, and to limit measurement to specific target sets.

Creating User-Defined Measures

To create a new user-defined measure, the user selects an "Add User-defined" option. This displays an "Edit User Defined Measure" dialog box as shown in FIG. 8. The dialog has data entry functions for numbers, mathematical symbols, and operations. The "Measures/Functions" section of the dialog box includes a list of primitive measures and a list of more complex mathematical functions.

Using the measurement equation editor, the user may enter any mathematical equation where the operands are either numerical constants or other measurements, into an equation constructor box 800. The user may also select existing measures (built-in or previously defined user-defined measures) to bring into the equation constructor box 800. Mathematical functions can also be selected and brought into the equation constructor box 800.

User-defined measures are created from existing, measures, whether primitive or a previous user-defined measure. To add a measure to the equation, the user selects it from the list of "Measures/Functions" list 802.

Other operators can also be inserted into the equation, from the "Label/SPath" options box 804, as follows:

i) Labels—'Labels' are tags that can be inserted into user-defined measure equations. They link selected measures with specific channels or target paths in which the selected measure will apply. Labels are preferably used for a densitometric measure.

ii) Target Path—The 'Target Path' controls are used to indicate that a measure must be made from a particular target set. Like Labels, they appear as tags (eg, <TargetSet-X>) that are inserted into the measurement equation.

To illustrate the use of a target path tag, suppose two linked targets have been defined, <Cell Bodies> and <Nuclei>, and the user wishes to measure the area of the cytoplasm within each cell body. The user could construct a user-defined 'Cytoplasm Area' measure in the linked target set using the following equation:

$$[Area<Cell\ Bodies>]-[Area<Nuclei>]$$

iii) Grouping Variables—The 'Grouping' controls allow the user to insert summary statistics for a given target set into a measurement equation.

Grouping controls are not used for generating summary statistics for the user-defined measure itself. Rather, grouping variables are used to generate summary statistics for measures within an equation defining a user-defined measure.

To illustrate the use of a grouping variable, suppose the users wants to express the gray level intensity of each target in TargetSet-X as a fraction of the target set's mean gray level intensity. The user could construct a user-defined measure in the TargetSet-X target set using the following equation:

$$[Dens-Levels]/[Dens-Levels<Mean:\backslash TargetSet\text{-}X>]$$

Exemplary Image Analysis Protocol—Translocation Index

For further illustration of how the invention can be used to solves actual analysis problems, a specific example of the process of protocol development, for a nuclear translocation assay, is given below. Nuclear translocation represents a process where cellular material moves from the cytoplasm of the cell to the nucleus in response to a molecular trigger. The degree of nuclear translocation is usually calculated by comparing the pixel intensities within the cell nucleus to the pixel intensities within the surrounding cytoplasm.

Creating an image analysis protocol to perform translocation index analysis can be done by a user as follows:

Creating a 'Nucleus' target set specifying appropriate pre-processing, segmentation and post-processing steps so that nucleus image objects are adequately segmented from the image background.

Creating a 'Cell Body' target set specifying appropriate pre-processing, segmentation and post-processing steps so that cell body image objects are adequately segmented from the image background.

Linking 'Nucleus' and 'Cell Body' together with an overlap criterion ('Nucleus' objects are 'within' 'Cell Body' objects) to create the 'Cell' target set.

Creating the following measures for the 'Cell' target set:

Nucleus Intensity:

$$[Dens - Levels < Nucleus >]$$

Cytoplasm Intensity:

$$\frac{[D \times A < CellBody >] - [D \times A < Nucleus >]}{[Area < CellBody >] - [Area < Nucleus >]}$$

Translocation Index:

$$\frac{[NucleusIntensity]}{[CytoplasmIntensity]}$$

Note that the Cytoplasm Intensity measure is relatively convenient to define using the user-defined measurement techniques of the present invention: mean intensity of the cytoplasm (which is the area of the cell body not covered by the nucleus) is simply the total intensity within this region (calculated by subtracting total intensity of nucleus from the total intensity of the cell body) divided by the area of this region (similarly calculated by subtracting the area of the nucleus from that of the cell body).

Applying this image analysis protocol to an image stack would identify each and every cell (composed of a nucleus within a cell body) in a given image and report the user-defined 'Translocation Index', 'Cytoplasm Intensity' and 'Nucleus Intensity' measures for each and every cell.

It should be understood that more, or less, complicated analysis protocols can be created by first defining relatively simple target identification (target set segmentation), linking these together to form arbitrarily complicated hierarchical relationships, being able to apply any of the primitive measurement calculations available (mean intensity, total intensity, area, perimeter, etc.) on any of these targets and being able to create an equation that combines any of these measurements applied to individuals or populations of these target sets.

During development of an image analysis protocol by a user, a set of image transformations may be provided. A processing component, referred to herein as a macro, may be defined by a user and may be used by the user to select image transformations from the set. If the set of image transformations is relatively large, the macro allows an efficient selection of image transformations to be performed, so that image analysis protocols may be developed more efficiently. A user may also search an image transformation or a macro during development of an image analysis protocol.

By selecting one or more of the nodes described previously with reference to FIG. 6, a user may edit settings corresponding to one or more of the nodes. Additionally, a user may obtain particular data of an image characteristic by selecting a particular area of an image.

The system of the present invention has no limit on the number of different objects (target sets) that can be identified and linked together. It provides a very flexible and extendable system for defining relationships between any target sets. The measurement system is able to report individual or population summary measurements applied to any of the target sets (e.g. comparing mean intensity of the nucleus to the mean intensity of the cytoplasm, comparing total intensity of the cytoplasm versus the number of granules identified within the cytoplasm).

The present invention is useful for identifying pharmacological agents for the treatment of disease. It provides a potentially automated, high throughput method for conducting a wide variety of biological assays where one or more markers, including luminescent markers, are employed to measure a biological response. Several markers may be used in conjunction to derive a variety of measurements, and the measurements may be determined automatically to ensure accuracy. Such assays can be conducted on chemical compounds or any molecule of biological interest, including but not limited to drug candidates, such as those found in combinatorial libraries, allowing high throughput screening of chemical compounds of biological interest.

The techniques of the present invention may be used in assays in which data are acquired on individual image objects, on a cellular or sub-cellular level. The assays may make use of any known fluorophore or fluorescent label including but not limited to fluorescein, rhodamine, Texas Red, Amersham Corp. stains Cy3, Cy5, Cy5.5 and Cy7, Hoechst's nuclear stains and Coumarin stains. (See Haugland, R. P., Handbook of Fluorescent Probes and Research Chemicals $6^{th}$ Ed., 1996, Molecular Probes, Inc., Eugene, Oreg.)

Note that the term "luminescence" as used herein is intended to include the phenomena of fluorescence and other types of luminescence such as chemiluminescence and phosphorescence.

The above embodiments are to be understood as illustrative examples of the invention. Further embodiments of the invention are envisaged. Whilst the above embodiments are embodiments in which biological image objects are analysed, other types of image data, such as cosmological image data, may be analysed using the present invention.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A computer-based method for the development of an image analysis protocol for analyzing image data, the image data containing images including image objects, the image analysis protocol being operable in an image analysis software system to report on one or more measurements conducted on selected ones of said image objects, the method comprising:

generating image data using an imaging system, the image analysis software being installed on the imaging system;

identifying a first target set of image objects in the image data;

identifying a second target set of image objects in the image data;

defining a pair-wise user-defined target link by specifying a spatial relationship between the first target set of image objects and the second target set of image objects;

selecting the first target set of image objects and the second target set of image objects based on the spatial relationship; and utilizing the pair-wise user-defined target link to combine the first target set of image objects and the second target set of image objects in the image data into a set of interrelated targets that form a linked target set, wherein each interrelated target in the linked target set includes one image object in the first target set of image objects and at least one image object in the second target set of image objects which is linked to the image object from the first target set based on the spatial relationship.

2. The method of claim 1, wherein said user-defined target link allows the user input to define a spatial relationship definition and specify the first target set in the relationship and the second target set in the relationship.

3. The method of claim 2, wherein said user-defined target link allows the user to define a one-to-one spatial relationship by matching an image object in the first target set of image objects with exactly one image object in the second target set of image objects.

4. The method of claim 2, wherein said user-defined target link allows the user to define a one-to-many spatial relationship by matching an image object in the first target set of image objects with one or many image objects in the second target set of image objects.

5. The method of claim 1, wherein said user-defined target link allows the user to define a criterion for linking:

an object in one of said first and second sets of image objects; and an object in the other of said first and second sets of image objects.

6. The method of claim 5, wherein said user-defined target link allows the user to define a spatial overlap criterion, the user-defined target link linking an image object in the first target set of image objects with an image object in the second target set of image objects based on the spatial overlap criterion.

7. The method of claim 6, wherein said user-defined target link further allows the user to define a degree of overlap as part of said spatial overlap criterion.

8. The method of claim 1, wherein said one or more measurements include morphometric measurements.

9. The method of claim 1, wherein said one or more measurements include densitometric measurements.

10. The method of claim 1, wherein said user-defined target link further allows the user to define said one or more measurements to apply to one of said first and second sets of image objects.

11. The method of claim 1, wherein said user-defined target link further allows the user to define a subset of one of said first and second set of image objects using said spatial relationship data.

12. The method of claim 11, wherein said user-defined target link further allows the user to define one or more measurements to apply to said subset of image objects.

13. The method of claim 1, wherein said user-defined target link further allows the user to select at least some of said one or more measurements from a set of primitive measurements provided in said image analysis software.

14. The method of claim 1, wherein said user-defined target link further allows the user to define at least some of said one or more measurements.

15. The method of claim 14, wherein said user-defined target link further allows the user to define at least some of said one or more measurements from a set of primitive measurements provided in said image analysis software.

16. The method of claim 14, wherein said user-defined target link further allows the user to define at least some of said one or more measurements from one or more previous user-defined measurements.

17. The method of claim 14, wherein said user-defined target link further allows the user to define at least some of said one or more measurements by defining a valid arithmetic equation whose operands are constant values, primitive measurements and/or user-defined measurements.

18. The method of claim 1, wherein said one or more measurements include a first measurement determined using said first set of image objects and a second measurement determined using said second set of image objects.

19. The method of claim 1, wherein said one or more measurements include a measurement derived from both said first set of image objects and said second set of image objects, said derivation being conducted based on said defined relationship.

20. The method of claim 1, comprising applying said method to biological image data acquired during biological experimental processes.

21. The method of claim 20, comprising performing the method with image data from a plurality of wells containing biological cells, organisms or tissues, the plurality of wells containing different test compounds or slides by detecting transmitted light.

22. The method of claim 21, wherein said cells, organisms, or tissues may comprise one first luminescent reporter, wherein said image data comprises an image created by detecting radiation emitted by said first luminescent reporter or by detecting transmitted light.

23. The method of claim 22, wherein said cells, organisms, or tissues may further comprise a second luminescent reporter, wherein said image data comprises data created by detecting radiation emitted by said second luminescent reporter or by detecting transmitted light.

24. The method of claim 1, wherein said one or more measurements include one or more measurements selected from the group consisting of a density measure, a density related measure, a basic morphometry measure, a chord measure, a diameter measure, a position measure, a scan area measure, a fiber-related measure and a user-defined measure.

25. The method of claim 1, further comprising:

identifying a first target set of image objects in the image data, the first target set including image objects of a first type; and identifying a different second target set of image objects in the image data, the second target set including image objects of a second type.

26. The method of claim 25 wherein the first type is the same as the second type.

27. The method of claim 25 wherein the first type is different than second type.

28. A computer-based method for analyzing image data, the image data containing images including image objects, using an image analysis protocol to report on one or more measurements conducted on selected ones of said image objects, the method comprising:

receiving a user input identifying a first target set of image objects in the image data;

receiving a user input identifying a second target set of image objects in the image data;

defining a pair-wise user-defined target link by specifying a spatial relationship between the first target set of image objects and the second target set of image objects;

utilizing the pair-wise user-defined target link to combine the first target set of image objects and the second target set of image objects in the image data into a set of interrelated targets that form a linked target set, wherein each interrelated target in the linked target set includes one image object in the first target set of image objects and at least one image object in the second target set of image objects which is linked to the image object from the first target set based on the spatial relationship;

performing one or more measurements which are to be reported for said first target set of image objects and the second target set of image objects, said measurements being conducted using said user-defined target link relationship; and displaying the one or more measurements which are to be reported for said first target set of image objects and the second target set of image objects on a display device.

29. A computer-based method for the development of an image analysis protocol for analyzing image data, the image data containing images including image objects, the image analysis protocol being operable in an image analysis software system to report on one or more measurements conducted on selected ones of said image objects, the method comprising:

providing a first target set of image objects in the image data;

providing a second target set of image objects in the image data;

defining a pair-wise user-defined target link by specifying a spatial relationship between the first target set of image objects and the second target set of image objects;

utilizing the pair-wise user-defined target link to combine the first target set of image objects and the second target set of image objects in the image data into a set of interrelated targets that form a linked target set, wherein each interrelated target in the linked target set includes one image object in the first target set of image objects and at least one image object in the second target set of image objects which is linked to the image object from the first target set based on the spatial relationship;

one or more user-defined measurements which are to be reported for said first target set of image objects and the second target set of image objects, said one or more user-defined measurements including a measurement defined from a plurality of predefined measurements; and displaying, on a display device, said one or more user-defined measurements which are to be reported for said first target set of image objects and said second target set of image objects.

30. The method of claim 29, wherein said predefined measurements include one or more measurements selected from the group consisting of density measures, density related measures, basic morphometry measures, chord measures, diameter measures, position measures, scan area measures, fiber-related measures and user-defined measures.

31. The method of claim 29, wherein the method further comprises defining said one or more user-defined measurements using an equation editor installed on a graphical user interface.

* * * * *